United States Patent [19]

Mouret et al.

[11] Patent Number: 4,838,015
[45] Date of Patent: Jun. 13, 1989

[54] FARM PRODUCT PICKUP BALER

[75] Inventors: Patrick Mouret, Mardie; Jean-Claude Galant, Saint Jean de Braye, both of France

[73] Assignee: Rivierre Casalis, Fleury Les Aubrais, France

[21] Appl. No.: 38,701

[22] Filed: Apr. 15, 1987

[30] Foreign Application Priority Data

Apr. 25, 1986 [FR] France ............... 86 06004

[51] Int. Cl.⁴ ............................................. A01P 59/00
[52] U.S. Cl. ................................. 56/15.7; 56/14.9; 172/47; 180/53.3
[58] Field of Search ............. 56/15.5, 341, 14.9, 56/15.1, 15.3, 15.7, 15.9, 15.2, 15.6, 16.1, 15.8, 364; 180/53.3; 172/47

[56] References Cited

U.S. PATENT DOCUMENTS 4,066,131 10/1982 Zandbergen .
4,306,494 12/1981 Nishibe et al. ................ 56/341
4,366,877 1/1983 Vissers et al. ................ 172/47
4,432,192 2/1984 Maier et al. ................ 56/15.7

FOREIGN PATENT DOCUMENTS 0196426 10/1986 European Pat. Off. .
3442831 1/1986 Fed. Rep. of Germany .
2546368 5/1983 France .
2558031 1/1985 France .
2106384 4/1985 France .
1171579 12/1986 France .
550824 11/1956 Italy ................. 56/15.9
2171884 9/1986 United Kingdom .......... 172/47

Primary Examiner—John Weiss
Attorney, Agent, or Firm—Oblon, Spivak, McClelland, Maier & Neustadt

[57] ABSTRACT

A farm product pickup baler has a frame, ground wheels and a baling device within the frame. A produce pickup device is connected to the frame, as is a tongue. A U-shaped hitch bar pivotably connects the tongue to lifting arms of a tractor about 2 orthogonal axis.

1 Claim, 3 Drawing Sheets

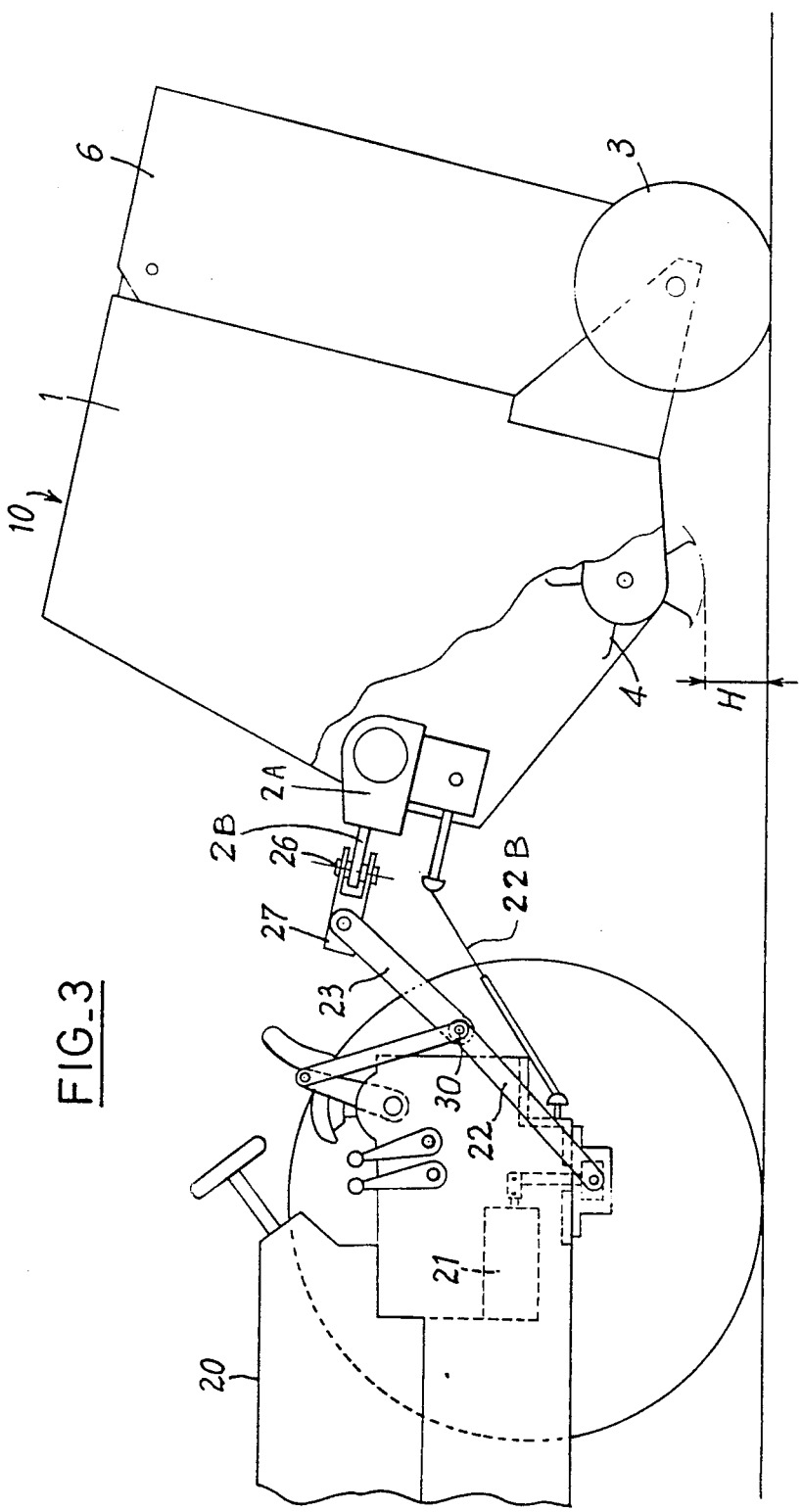
FIG_3

FARM PRODUCT PICKUP BALER

BACKGROUND OF THE INVENTION

1. Field of the Invention

The invention relates to a unit consisting of a pickup baler for farm products, hitched to a tractor, the baler having a frame on which a pickup device is mounted to pivot on its lower part and which carries on its upper part means for forming a bale of hay and which is mounted on a pair of wheels in contact with the ground.

2. Background of the Prior Art

Such a baler is known from French patent publication FR-A-2 558 031 in which the pickup device rests on the ground by means of wheels and which can freely rotate in relation to the frame around a stationary axis.

In this case, the act of lifting the pickup device to respond to unevenness of the ground reduces the size of the entrance of the chamber for forming the bale and reduces the performance of the baler.

To solve this problem, French patent publication FR-A-2 546 368 proposes a baler in which the pickup device is fixed in relation to the entrance of the chamber for forming the bale and the wheels of the baler are mounted on the frame by a means for adjusting the height of the frame and the pickup device.

Complications of the baler resulting from the construction of a suspension system for the frame necessitate the design of specially suited elements which increase the price of the machine.

SUMMARY OF THE INVENTION

The invention has as its object a unit consisting of a pickup baler hitched to a tractor whose construction makes it possible to protect the pickup device from impacts against obstacles or to change the position of the device in relation to the ground to improve the pickup conditions as a function of the product to be harvested.

The invention also has as its object such a unit whose construction makes it possible to assure a simple adjustment and a rapid modification of the position of the device in relation to the ground.

The invention comprises a unit consisting of a pickup baler whose frame is extended toward the front by a tongue by which the baler is hitched to the tractor which carries, in the back, hinged lifting arms for lifting of farm tools. According to the invention, the end of the tongue of the baler carries the pivot pin of an elbowed hitching bar having an inverted U shape with legs directed toward the lifting arms and coupled to the lifting arms, and whose horizontal part is mounted to swivel on the tongue.

The unit thus constructed uses the lifting and hitching device of the tractor to raise or lower the baler to keep from damaging the pickup device during road transport of the baler.

The unit thus constructed allows the adjustment of the pickup device by the controls of the lifting device, such controls already being placed in the driving cab of the tractor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a view in elevation of the pickup baler unit and tractor in raised position of the pickup device of the baler.

DETAILED DESCRIPTION OF THE PREFERRED EMBODIMENT

Figure 1:
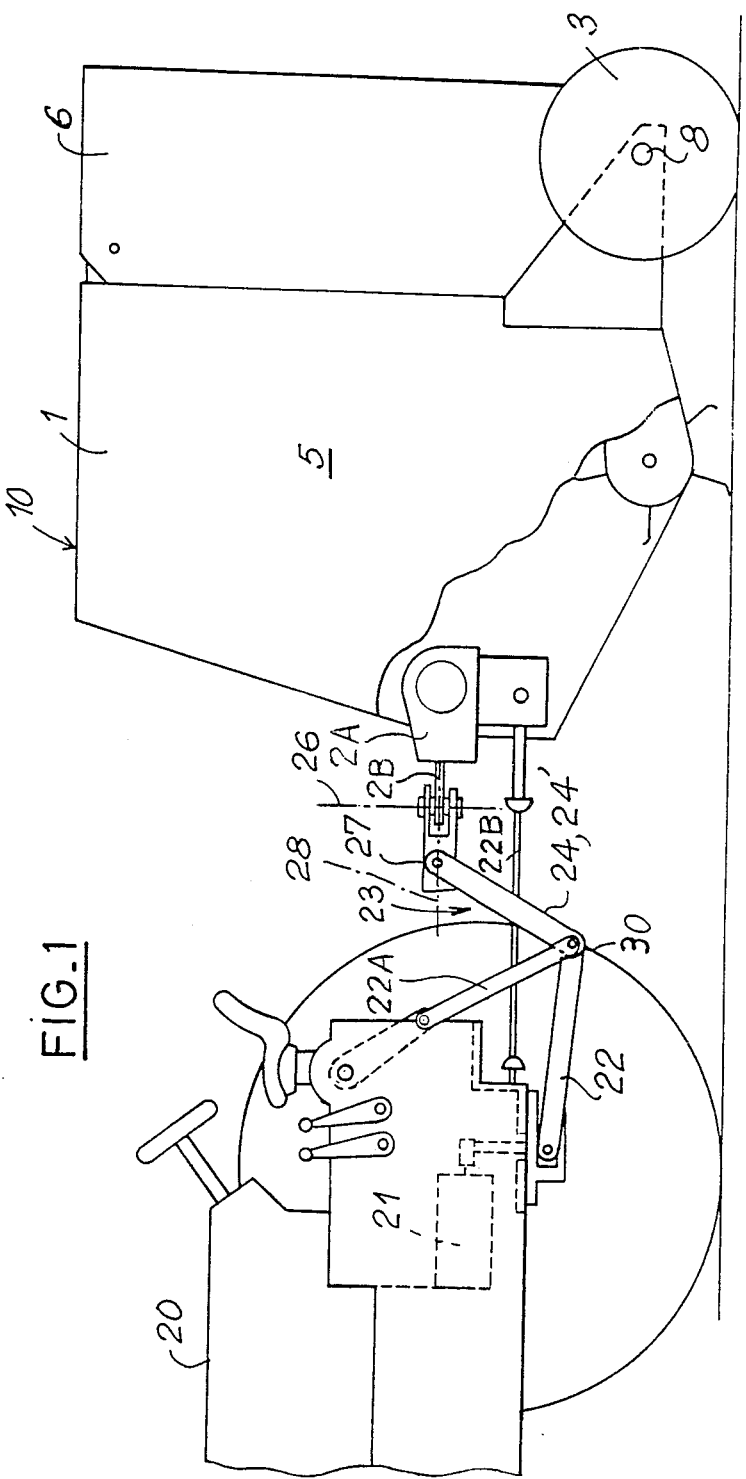
FIG. 1 is a diagrammatic view in elevation of a pickup baler hitched to a tractor in working position.
Figure 2:
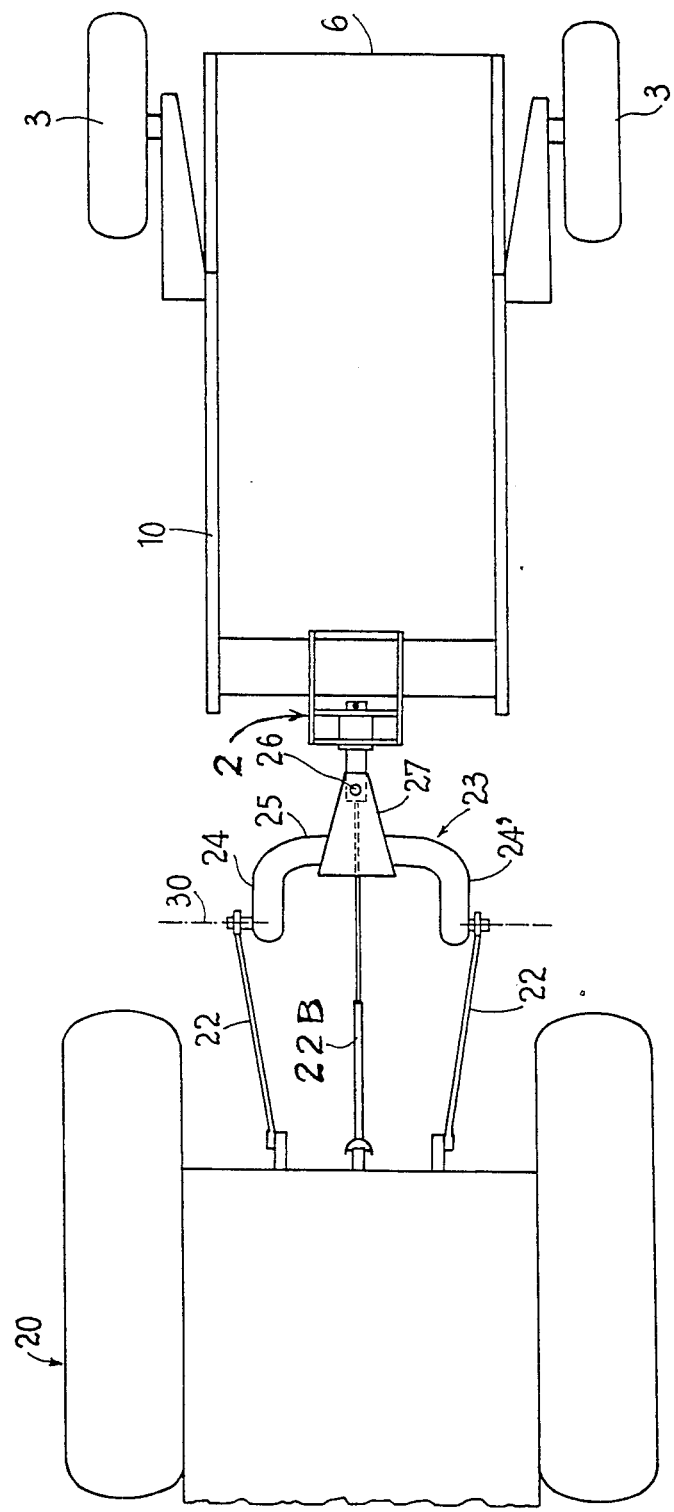
FIG. 2 is a top view of the unit shown in FIG. 1.

As shown in FIG. 1, pickup baler 10 consists of a frame 1 which is extended toward the front by a hitching tongue 2 and which rests on the ground by wheels 3. The lower part of frame 1 carries a toothed pickup device 4 which picks up and introduces the harvested product, such as hay, into the upper part of the frame. A chamber within the frame contains means 5 for forming the bale of the introduced hay. A raisable tailgate 6 connected to the frame makes possible the ejection of the completed bale. By way of example, forming means 5 can consist of a system of belts and/or rollers, as is well known.

Baler 10 is driven by a tractor 20 having a hydraulic lifting device 21 operated from the driver's seat. Motive power to the bailer and pickup device is transmitted from the power take-off of the tractor via universal joint drive shaft 22B.

The lifting device 21 controls a conventional hitch including two sets of lifting arms 22 and 22A.

According to the invention, lifting arms 22–22A are pivotally coupled via pins having horizontal axis 30 to legs 24, 24' of an elbowed hitching bar 23 which has a general inverted U shape with the legs 24, 24' directed toward lifting arms 22–22A. To the median horizontal part 25 of the hitching bar is fixedly mounted a support 27 which is pivoted to an extension 2B of tongue 2 via a pivot pin having axis 26. The tongue 2 comprises a frame part 2A fixed to the frame 1 and the extension 2B is rotatably mounted to the frame part 2A of the tongue in a manner so as to turn around an axis 28 orthogonal to the pivot pin having axis 26.

The pivot pin having axis 26 in this way makes possible the reorientation of baler 10 when it is being pulled by tractor 20.

Axis of rotation 28 extends parallel to the longitudinal axis of the baler and prevents the application of horizontal torsion to the frame of the baler when its wheels rest on a slope which is angled in relation to the longitudinal center line of the tractor.

To adjust height H of the teeth of pickup device 4 in relation to the ground, lifting device 21 of the tractor is actuated. Lifting arms 22–22A then raise hitching bar 23. Hinge axis 30 of arms 22–22A on bar 23 allows changes of direction of the bar 23 relative to arms 22–22A. The relatively rearward position of wheels 3 in relation to tongue 2 makes possible the lifting of pickup device 4 above the ground by height H during the raising of the tongue around the axis of wheels 3.

Without going outside the scope of the invention, it will of course be possible to replace the baler with any other hay baler, and particularly by parallelipipedic balers.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pickup baler for harvesting a crop adapted to be driven by a tractor provided with a lifting device, said baler comprising:

a frame attaches to wheels vesting on the ground;

baling means mounted within said frame;

toothed pickup means mounted on said frame and protruding therefrom substantially downwardly towards the ground for picking up said crop such as hay, said wheels being positioned rearwardly of said toothed pickup means;

a hitching tongue having an extension is connected to said frame;

a two-legged U-shaped hitching bar pivotally connected to said extension of said hitching tongue about a pivot pin axis that is substantially vertical;

two sets of lifting arms controlled by the lifting device of the tractor and pivotally mounted at one of their ends onto said tractor and pivoted at their other ends to the respective ends of the two legs of said U-shaped hitching bar about a substantially horizontal pivoting axis;

wherein said extension is rotatably mounted to hitching tongue so as to turn around an axis that is orthogonal to said pivot pin axis and extends parallel to the longitudinal axis of the baler, whereby said lifting arm, when moved by said lifting device, vertically move the hitching bar which correspondingly changes its direction relative to said lifting arms and varies the height of said toothed pickup means above the found while preventing the application of torsion to the baler frame.

* * * * *